(12) United States Patent
Schmidt

(10) Patent No.: US 10,907,337 B1
(45) Date of Patent: Feb. 2, 2021

(54) DEVICES, SYSTEMS AND METHODS FOR PROTECTING FLOORING BENEATH TOILETS

(71) Applicant: Phillip Schmidt, Glen Flora, WI (US)

(72) Inventor: Phillip Schmidt, Glen Flora, WI (US)

( * ) Notice: Subject to any disclaimer, the term of this patent is extended or adjusted under 35 U.S.C. 154(b) by 0 days.

(21) Appl. No.: 16/597,126

(22) Filed: Oct. 9, 2019

Related U.S. Application Data

(60) Provisional application No. 62/766,199, filed on Oct. 9, 2018.

(51) Int. Cl.
| | | |
|---|---|---|
| *E03D 11/16* | (2006.01) | |
| *F16L 5/02* | (2006.01) | |
| *E03D 11/13* | (2006.01) | |
| *E03D 1/01* | (2006.01) | |

(52) U.S. Cl.
CPC ............... *E03D 11/16* (2013.01); *E03D 1/01* (2013.01); *E03D 11/135* (2013.01); *F16L 5/02* (2013.01)

(58) Field of Classification Search
CPC ......... E03D 11/16; E03D 1/01; E03D 11/135; F16L 5/02
USPC ........................................................... 5/251.1
See application file for complete search history.

(56) References Cited

U.S. PATENT DOCUMENTS

| | | | |
|---|---|---|---|
| 1,785,877 A | 12/1930 | Rubner | |
| 2,152,719 A * | 4/1939 | Williams | E03D 11/16 4/252.6 |
| 2,575,130 A | 11/1951 | Rubner | |
| 2,626,403 A | 1/1953 | Butow | |
| 2,756,440 A | 7/1956 | Addison, Jr. | |
| 5,309,579 A * | 5/1994 | Nelson | E03D 11/16 285/42 |
| 5,608,922 A * | 3/1997 | Lewis | E03D 11/16 137/312 |
| 6,085,361 A * | 7/2000 | Whitaker | E03D 11/16 4/251.1 |
| 6,128,947 A | 10/2000 | Anderson, Sr. | |
| 6,457,188 B1 * | 10/2002 | Lindberg | E03D 11/02 4/251.1 |
| 7,069,603 B2 | 7/2006 | Flushing | |
| 7,458,109 B1 * | 12/2008 | Kreisel | E03D 11/16 4/251.1 |
| 7,621,002 B1 * | 11/2009 | Helmstetter | E03D 11/16 4/252.1 |
| 8,691,024 B2 | 4/2014 | Barniak | |

(Continued)

*Primary Examiner* — Janie M Loeppke
(74) *Attorney, Agent, or Firm* — Anthony J. Bourget

(57) ABSTRACT

Methods, systems and devices for protecting flooring beneath a toilet having a toilet base set over a drain pipe in the flooring, including a device and system having a tray defining a hole configured to be positioned over the drain pipe, the tray having an outside perimeter edge surrounding the hole and defining a field which extends outward from the toilet base when the toilet is positioned upon the tray, and a liquid retainer configured for placement upon the field and having a first end portion to abut a first external area of the toilet base and a second end portion to abut a second external area of the toilet base. The tray may be cut with a scissors to universally match a variety of toilet bases and is of low profile to be undetectable or nearly undetectable (concealed) to a normal casual viewer. The field is configured to receive stray liquid from the toilet crossing a seep line while a side edge perimeter of the toilet is sealed.

20 Claims, 8 Drawing Sheets

(56) References Cited

U.S. PATENT DOCUMENTS

2009/0077728 A1\* 3/2009 Garcia ............... A47G 27/0206
                                                     4/251.1

\* cited by examiner

DEVICES, SYSTEMS AND METHODS FOR PROTECTING FLOORING BENEATH TOILETS

CROSS-REFERENCE TO RELATED APPLICATIONS

This application claims the benefit and priority of Provisional Patent Application Ser. No. 62/766,199, filed Oct. 9, 2018 for STOPROT, incorporated herein by reference in its entirety for continuity of disclosure.

BACKGROUND OF THE INVENTION

1. Field of the Invention

This invention relates to the field of protecting devices, systems and methods, and particularly to devices, systems and methods for preventing water damage to flooring beneath toilets.

2. Background Information

There are many examples of devices intended to prevent liquids from damaging the flooring beneath toilets, including devices such as pans or aprons positioned in different varieties underneath toilets or flush tanks. Some devices for attempting to solve the problem are readily visible when looking at the toilet, and some devices have been awarded patents, such as the devices shown in U.S. Pat. Nos. 7,458,109, 8,691,024, 6,128,947, and 1,785,877, among others.

While the foregoing show a variety of attempts to provide protection to flooring beneath a toilet, there is room for improvement.

SUMMARY OF THE INVENTION

Applicant has recognized problems with the prior devices in limiting seepage of liquids to flooring beneath toilets, including that prior devices may be ineffective or have varying degrees of effectiveness, and also that such prior devices or systems are readily visible when even casually looking at the toilet. Applicant has developed an improved device which is both effective and concealed or relatively concealed when used in conjunction with a toilet.

In one aspect the present invention includes a device for protecting flooring beneath a toilet having a toilet base set over a drain pipe in the flooring, the device having a tray having a planar base, an inside perimeter wall defining a hole configured to be positioned over the drain pipe, an outside perimeter edge surrounding the hole and defining a field which extends outward from a footprint of the toilet base when the toilet is positioned upon the tray, and a raised ring circling the hole. In one aspect the perimeter wall extends downward from the raised ring and below the planar base. In aspects the field extends beyond a perimeter of the toilet base and when cut with a scissors, the field is limited to a seep field configured to receive liquid that leaks when a wax seal positioned under the toilet is failing. The tray is cut to match closely the perimeter of the base of the toilet with only a small seep field portion extending from the toilet at the floor level, which extension occurs at a remote or relatively invisible area of the toilet and flooring. A person may periodically bend to look behind a toilet to monitor whether there is a leak situation as a precaution. A liquid indicator which changes color may be provided at the field for further warning.

In a further aspect the present invention includes a system for protecting flooring beneath a toilet having a toilet base set over a drain pipe in the flooring, the system including a tray defining a hole configured to be positioned over the drain pipe, the tray having an outside perimeter edge surrounding the hole and defining a field which extends outward from the toilet base when the toilet is positioned upon the tray, and a liquid retainer configured for placement upon the field and having a first end portion to abut a first external area of the toilet base and a second end portion to abut a second external area of the toilet base. In aspects the liquid retainer is mounted to the field and a sealant is used to seal along the perimeter edge of the tray while leaving a seep line at a portion along the base of the toilet to allow liquid to seep to the field.

In a further aspect the invention includes a method for protecting flooring beneath a toilet having a toilet base set over a drain pipe in the flooring, the method including placing the toilet base upon a tray, the toilet base and tray defining a meeting line oriented around an entire perimeter of the toilet base, a portion of the tray defining a field extending beyond the perimeter of the toilet base, and securing a liquid retainer to the field, the retainer having a first end portion in contact with a first external area of the toilet base and having a second end portion in contact with a second external area of the toilet base, a portion of the meeting line oriented a shortest distance between the first end portion and second end portion defining a seep line, at least a portion of the seep line devoid of a sealant. The apparatus, systems and methods may be used to retrofit existing toilets or for new construction. A further aspect includes a kit in which is packaged in a box the device and liquid retainer, along with instructions such as an instruction sheet illustrating how to place, cut and set the device for use with a toilet and wax seal upon a flooring.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
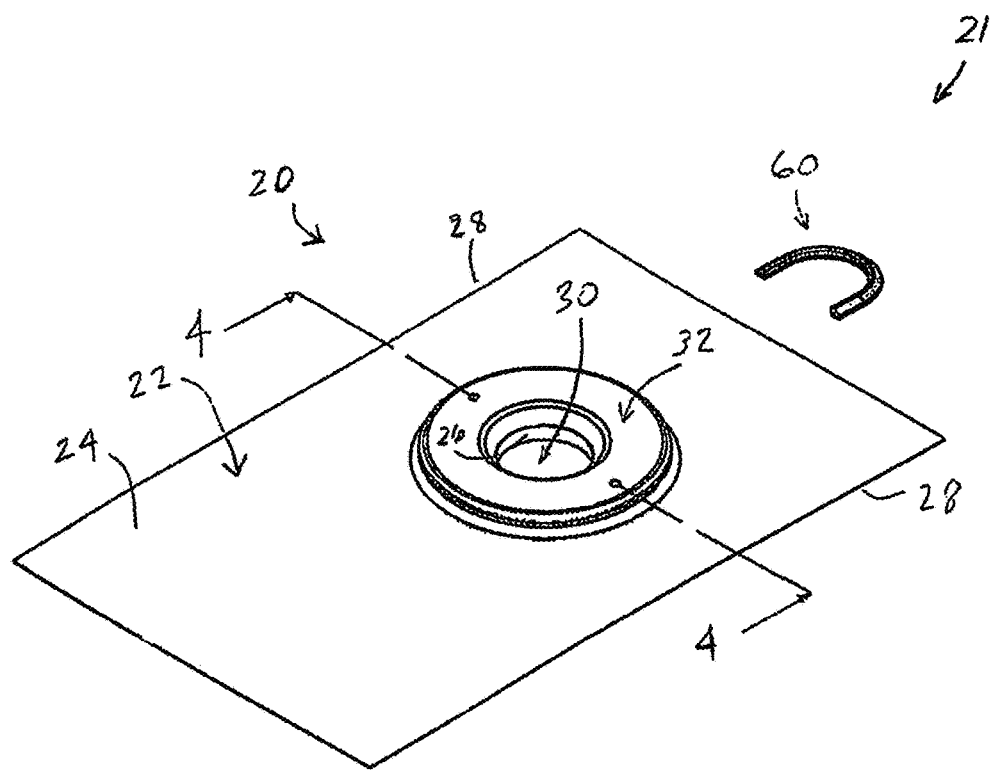
FIG. 1 is a perspective view of a device and system made in accordance with one aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Figure 2:
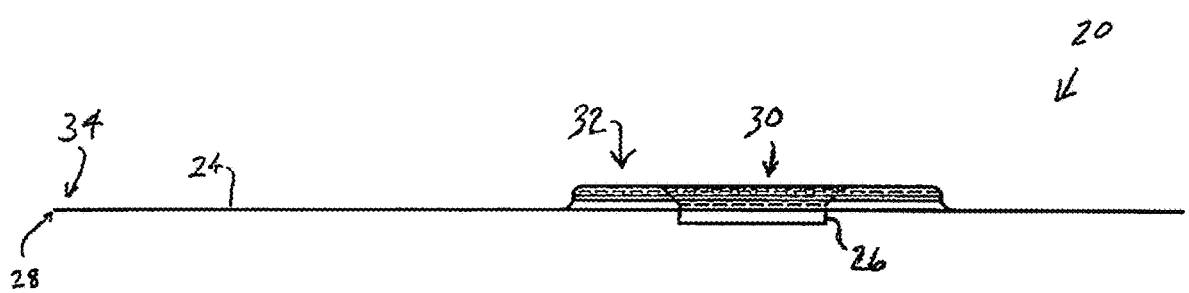
FIG. 2 is a side view of the apparatus shown in FIG. 1.
Figure 3:
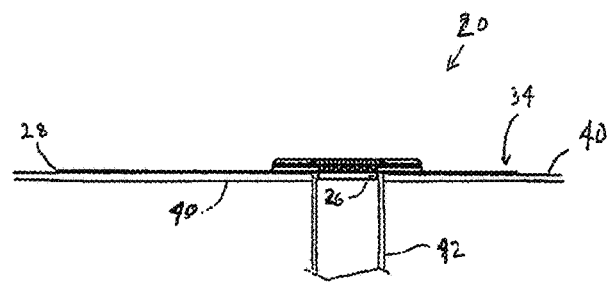
FIG. 3 is a section view of the apparatus of FIG. 1 in conjunction with a representative application.
Figure 4:
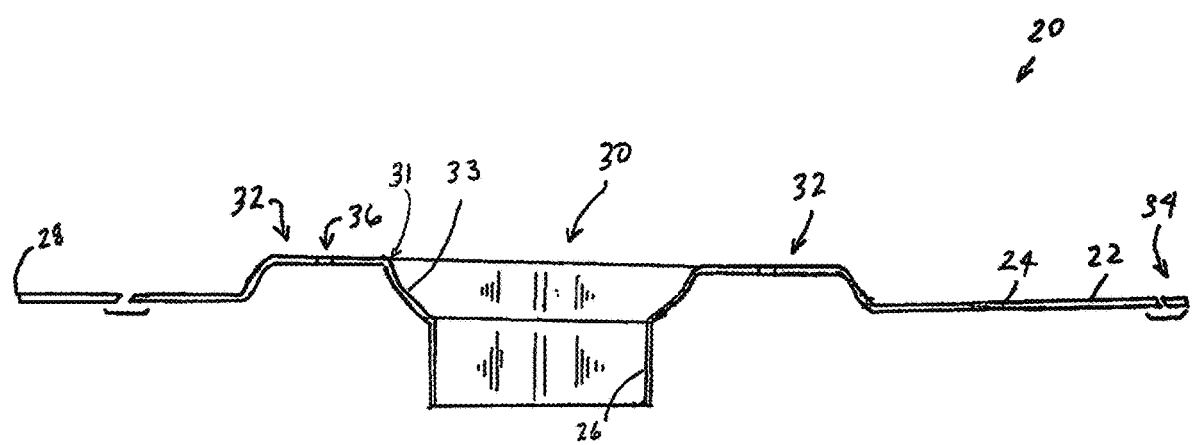
FIG. 4 is a section view taken along the line 4-4 of FIG. 1.

Referring to FIGS. 1-13 aspects of devices, systems and methods in accordance with the invention are shown. FIG. 1 is a perspective view showing apparatus 20 and system 21 aspects of the invention. FIG. 2 is a side view of device 20, and FIG. 3 is a side view of device 20 illustrating representative placement upon flooring 40. FIG. 4 is a section view of device 20 taken along line 4-4 of FIG. 1. Apparatus or device 20 is configured to be placed between a toilet 50 and toilet flooring 40 in order to prevent liquids from leaking onto the flooring 40 and causing damage.

In one aspect, device 20 includes a tray 22 having a base 24 with an inside perimeter wall 26 defining a hole 30. In other aspects hole 30 is defined by an inner edge of tray 22. The hole 30 leads to a drain pipe 42 which is commonly used in conjunction with toilets. Tray 22 has a planar base 24 with an outside perimeter edge 28 surrounding the hole 30. In one aspect tray 22 is made of semi-rigid plastic material, such as polyvinylchloride (PVC) or other material. Other plastics or materials may be used as desired for creating tray 22. In one aspect tray is vacuum formed as a unitary piece of PVC. In one aspect, tray 22 has a material thickness of about 0.03 inches which accommodates cutting of tray 22 by use of a common handheld scissors or knife or razor blade or other cutting device. Tray 22 may have a greater or lesser material thickness. A narrow thickness of tray 22 allows for device 20 to have a lower profile and to be better concealed when positioned beneath a toilet. In general, tray 22 is semi-rigid in that it holds its shape and does not bend or flex unless some force is applied. In one aspect tray 22 has a rigidity such that it will avoid sagging when held at one end.

Figure 5:
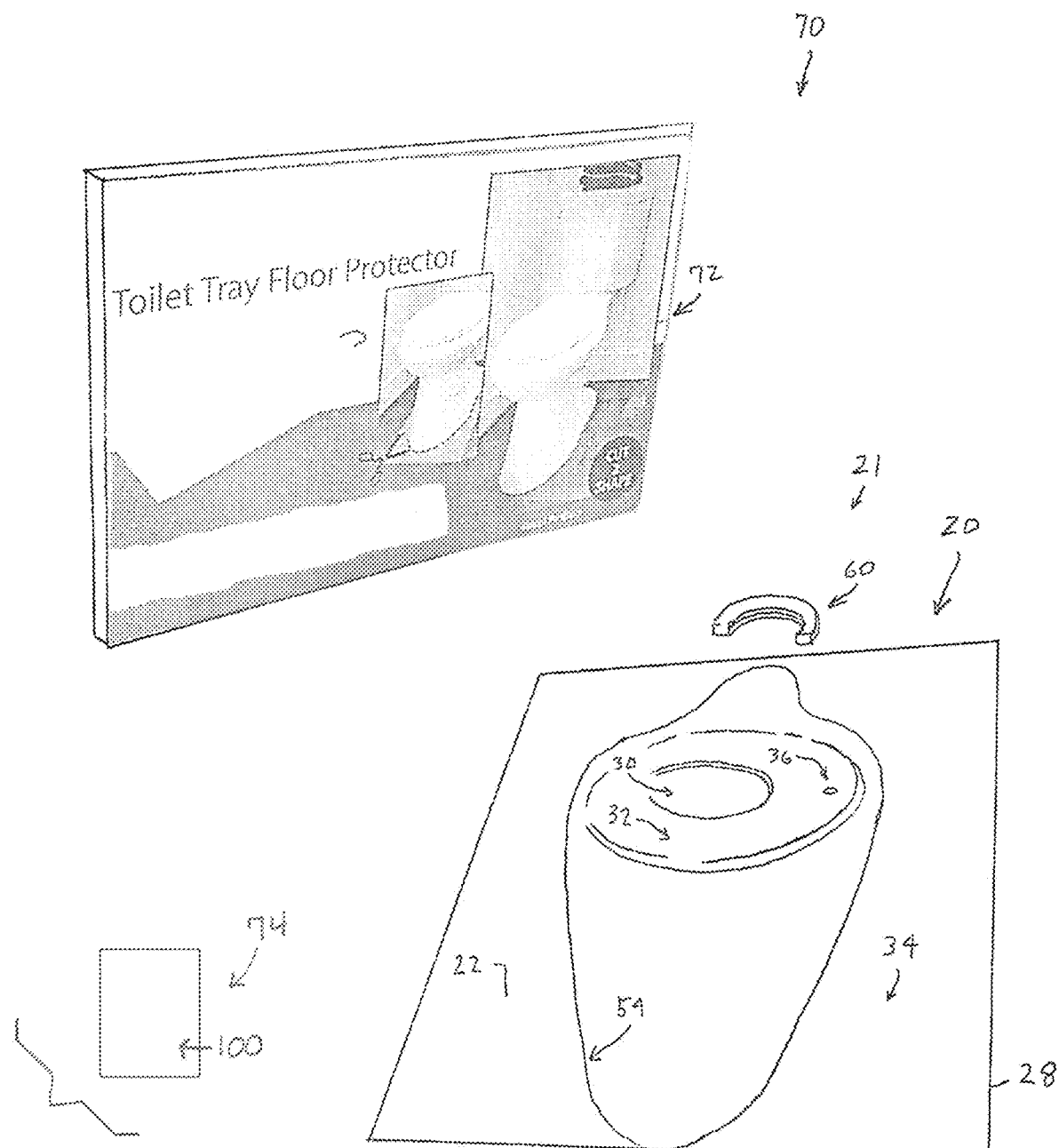
FIG. 5 is a perspective view of device and system of FIG. 1 in a further aspect and a further kit aspect of the invention.

FIG. 5 is a perspective view illustrating a step in the preparation and use of device 20, system 21 and method 100 aspects of the invention. In one aspect, device 20 is custom modified to fit a particular toilet 50 (or to fit other toilets as needed). For instance, a toilet 50 includes a toilet base 52. When the toilet with base 52 is placed upon tray 22, the toilet base 52 defines a footprint upon the tray 22 having a footprint edge 54 oriented around the exterior perimeter of the toilet base 52. A worker creates a line upon the tray 22 corresponding to the footprint edge 54 by using a marker, pencil, knife or other marking instrument. The line may trace the entire footprint edge of the toilet base 52 or may be a dotted or dashed line or other marking of the footprint edge 54. The portion of the tray 22 which extends beyond the footprint edge 54 is defined as the field 34. In one aspect, the field 34 surrounds the entire footprint edge 54. It may be appreciated that the shape of the footprint edge 54 will vary depending on the shape of the toilet base 52. Device 20 is configured to be universal in that device 20 may be positioned beneath all or most toilet bases 52 such that at least a portion of the tray 22 will define a field 34. For instance, for all or most styles of toilets, device 20 will be larger than the footprint of the toilet. In one aspect, tray 22 has a length of 24 inches and a width of 15 inches, which typically comprises an area large enough to cover all or most of the footprint of standard toilets. The tray 22 may have a length much longer (or shorter) than 24 inches as desired, or a width much longer (or shorter) than 15 inches as desired.

Figure 6:
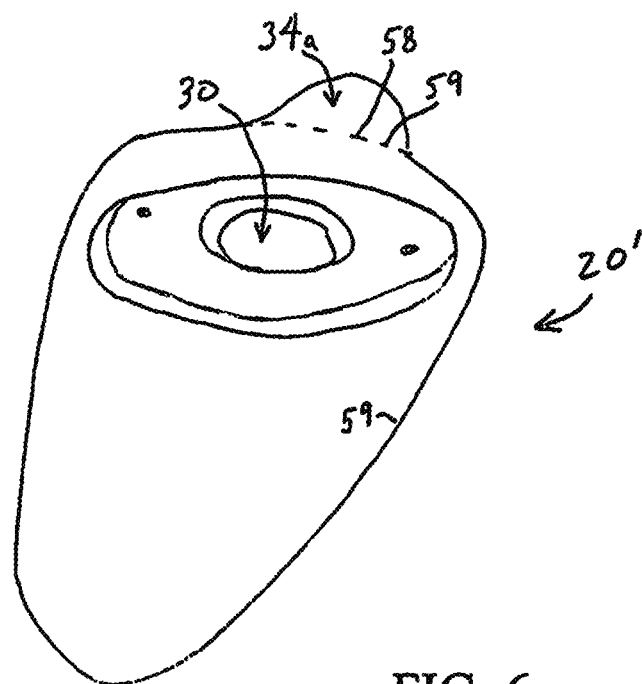
FIG. 6 is a perspective view of the device shown in FIG. 1 in a further aspect.

In one aspect, toilet base 52 is placed upon tray 22 and a line is formed along the footprint edge 54 as generally shown in FIG. 5. A worker may trace or mark a line along the footprint edge 54 or perimeter of the base 52 of toilet 50. In one aspect, a portion of the footprint of the base 52 is not marked or traced (or cut) so that a seep field 34a may be formed. Field 34a extends beyond the perimeter edge of toilet base 52 even after the tray 22 is cut along line 54. FIG. 6 shows device 20 with tray 22 having been cut along the line corresponding with the footprint edge 54 yet with a portion, for instance, seep field 34a, extending outward. The seep line 58 corresponds to a portion of the footprint edge 54 which would otherwise align with the perimeter or footprint edge of the toilet base 52. As presented further below, seep field 34a is also used in system 21 and method 100 aspects of the invention.

When marking tray 22 with a line corresponding to footprint edge 54, the device 20 is positioned on top of flooring 40 and drain pipe 42. A toilet such as toilet 50 is placed upon device 20 with securing bolts passing through mounting ports 36 of tray 22 and upward through corresponding mounting ports positioned at the base 52 of toilet 50 in order to secure toilet 50 to the floor 40 in normal fashion. Thereafter a line is drawn or marked to correspond to the footprint edge 54 and edge of seep field 34a. After the tray 22 is marked, the toilet 50 is removed from the device 20, the device 20 lifted and tray 22 cut along the marking to form the cut device 20' shown in FIG. 6. The device 20' is then repositioned upon drain pipe 42 with securing bolts passing through mounting ports 36 so that device 20' is in the original alignment and set to again receive the toilet 50.

Figure 7:
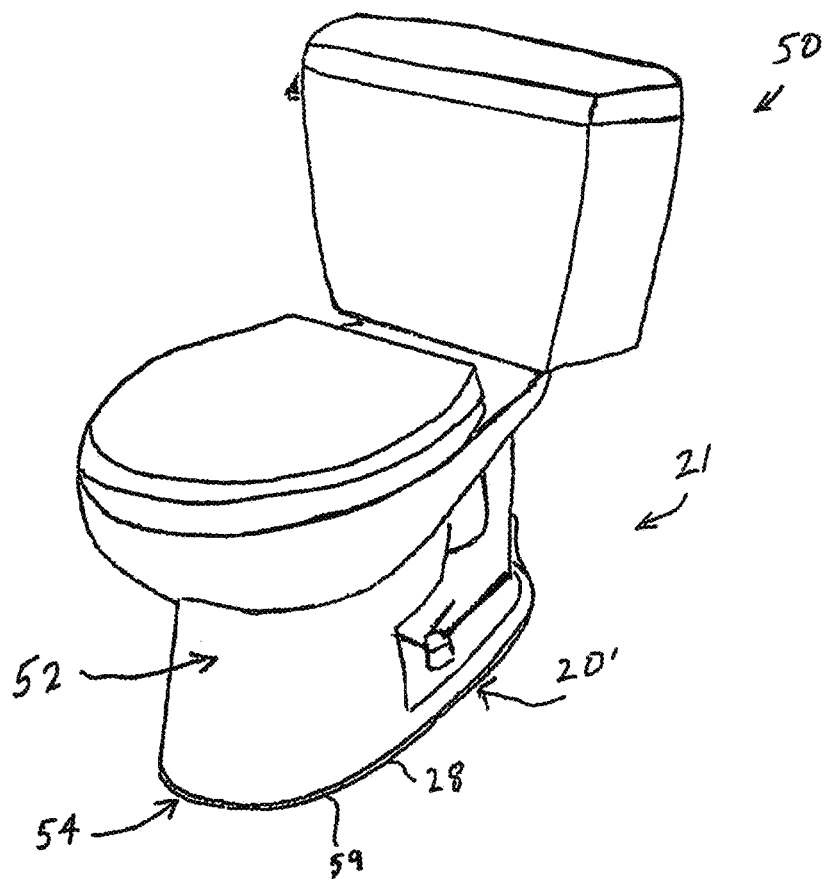
FIG. 7 is a perspective view of the apparatus and system of FIG. 1 in further aspects and in conjunction with a representative application.
Figure 8:
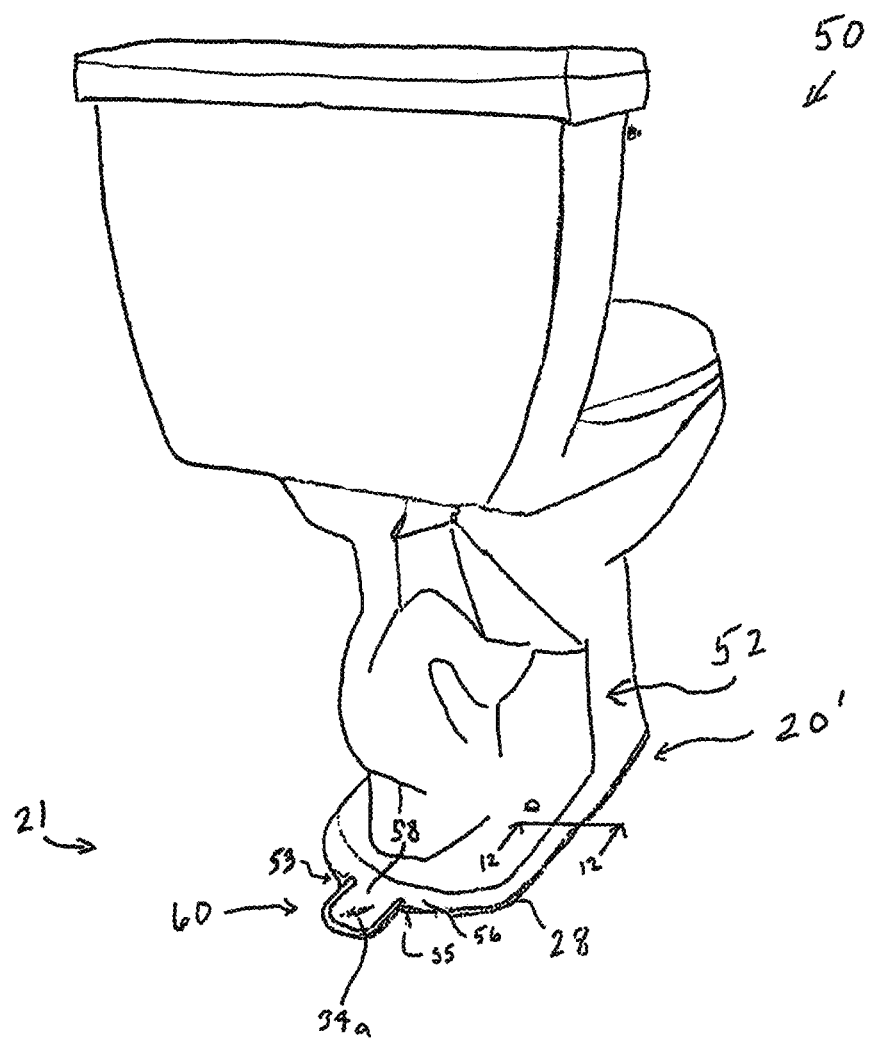
FIG. 8 is a rear perspective view of the apparatus and system of FIG. 1 in further aspects and in conjunction with a representative application.

FIG. 7 is a front perspective view of a representative toilet 50 used in conjunction with the apparatus 20 and systems 21 and methods 100 of the present invention. FIG. 8 is a reverse perspective view of a representative toilet 50 used in conjunction with the apparatus 20 and systems 21 and methods 100 of the present invention. Toilet 50 is positioned on top of device 20' and secured to the floor 40 using securing bots. Prior to placement of toilet 50 upon device 20', in one aspect a wax seal or wax seal ring is placed on tray 22. Particularly, tray 22 includes a raised ring 32 which circles the hole 30. A wax wall 33 (FIG. 4) provides a transition between an upper portion of raised ring 32 and inside perimeter wall 26. A wax seal may be positioned about the hole 30 at wax wall 33. Thereafter, toilet 50 is positioned on top of tray 22 and secured using securing bolts passing through mounting ports 36. If or when the wax ring fails, liquids which would otherwise leak onto floor 40 are captured by tray 22. In the event of continuing leaking or failure of wax ring, the liquids which are captured by tray 22 will travel or seep to seep field 34a as described further below. In further aspects, a wax ring or wax rings may be used or also positioned beneath device 20'. Multiple wax rings or other seals may also be used on top of device 20' as desired.

With further reference to FIG. 8, seep field 34a is shown at a rear portion of toilet 50. Toilet 50 is positioned upon device 20'. A liquid retainer 60 is positioned upon the field 34 to form seep field 34a. Field 34a may be positioned at different places along footprint edge 54 as desired in order to conceal or better conceal liquid retainer 60 from direct or open view. Placement of retainer 60 at a rear portion is considered a desired placement for most applications in order to conceal the open view of the retainer 60.

Figure 9:
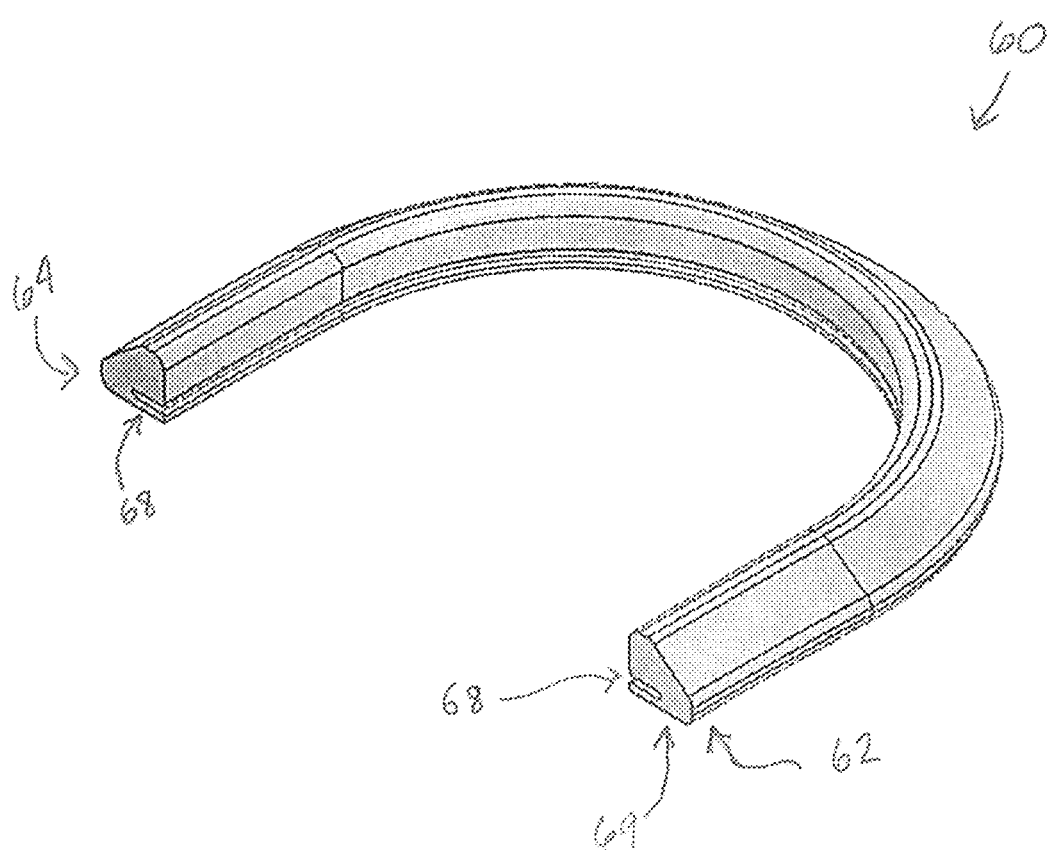
FIG. 9 is a perspective view of a component in accordance with a further aspect of the invention.
Figure 13:
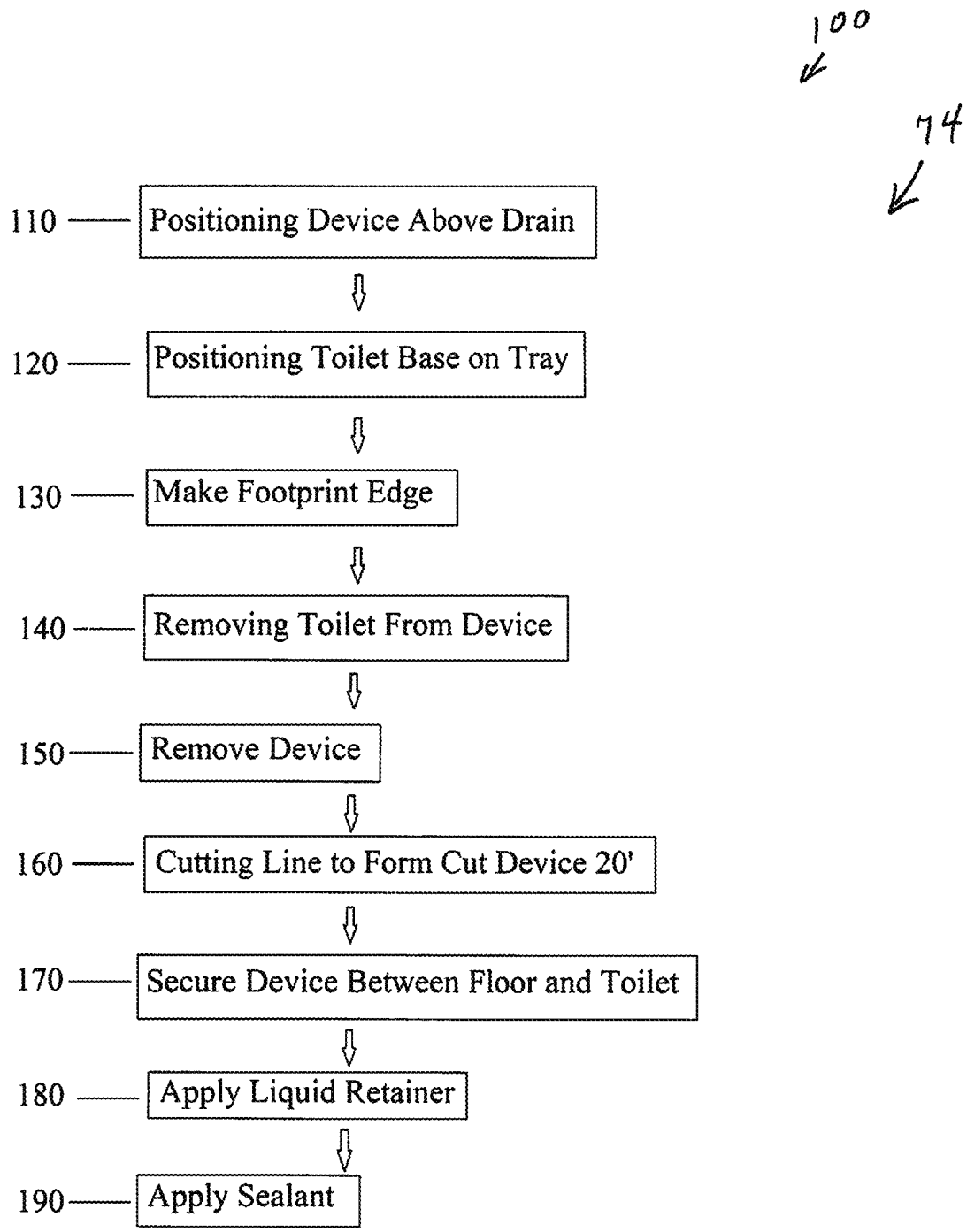
FIG. 13 is a flow chart in accordance with a method aspect of the invention.

FIG. 9 is a perspective view of a liquid retainer 60 in accordance with one aspect of the invention. Retainer 60 in one aspect is flexible and includes a slot 68 configured to receive an edge of device 20'. For instance, device 20' may be cut such that field 34*a* extends rearward of toilet 50 such that retainer 60 inserts upon field 34*a* at slot 68. Field 34*a* may have a perimeter edge corresponding to the curved shape of retainer 60, and/or retainer 60 may conform to the shape of perimeter edge of field 34*a*. Retainer 60 in one aspect friction fits to field 34*a* at slot 68. In other aspects, retainer 60 is secured to a top portion of field 34*a*, by use of an adhesive, for instance. In one aspect retainer 60 has a flat bottom surface 69 so that retainer 60 sits upon field 34*a*. An adhesive may be applied to bottom surface 69 to adhere retainer 60 to field 34*a*. In one aspect retainer 60 is an injection molded liquid trim piece or retainer. In one aspect, the retainer 60 is made of thermoplastic rubber (TPR) which maintains both the characteristics of rubber and plastic. TPR material is formed of synthetic rubber such that it melts into a liquid when heated and becomes a solid when cooled, and has elasticity similar to cross-linked rubber materials. In one aspect retainer 60 is formed into a flexible curved retainer, and in some aspects has a length of about 5 to 10 inches measured along the retainer between end portions 62, 64. In some aspects, retainer 60 is formed into a flexible curved retainer having a length measured directly between end portions 62, 64 of about 3 inches. Retainer 60 may be of different sizes and shapes as desired. The retainer 60 and field 34*a* may be positioned about a toilet 50 such that they are substantially concealed, and may also be colored and textured to blend in with surrounding flooring. In a case where a toilet is to be positioned in a corner of a bathroom, for instance, the field 34*a* and retainer 60 may be cut and placed to extend from a perimeter of the toilet base 52 toward the corner of the bathroom (instead of extending directly rearward of the toilet base 52) to better conceal the retainer 60 and field 34*a* from view. Device 20 may include a base 24 having a very large field 34 to accommodate placement at various positions about a toilet 50.

Figures 10, 11:
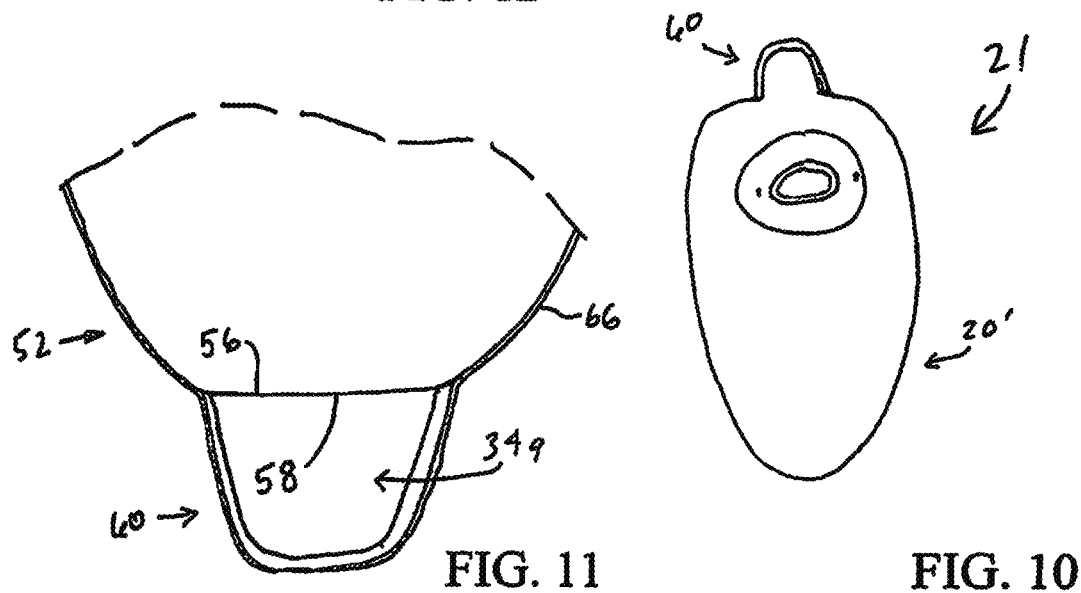
FIG. 10 is a top view of an apparatus and system in accordance with a further aspect of the invention.
FIG. 11 is a partial top view of an apparatus and system in accordance with a further aspect of the invention.

FIG. 10 is a top view illustrating a representative system 21 with retainer 60 secured to device 20'. FIG. 11 is a partial top view of a toilet base 52 positioned on top of device 20' with retainer 60 positioned on top of device 20' and in part forming seep field 34*a*. Particularly, first end portion 62 and second end portion 64 of retainer 60 are positioned against side edge 56 of toilet base 52 at a lower edge of the side edge 56. A sealant 66 is applied along the meeting line 59 which is where toilet base 52 meets the tray 22. In one aspect a sealant is applied to nearly an entirety of the meeting line 59 around the toilet base 52. For instance, in one aspect there is no sealant applied to the meeting line positioned between the first end portion and second end portion of the retainer 60. Particularly, a portion of the meeting line 59 oriented a shortest distance between the first end portion 62 and second end portion 64 defines a seep line 58. At least a portion of seep line 58 is devoid of a seal or sealant. In further aspects, no portion of the seep line 58 includes a seal or sealant. The remainder of meeting line 59 may include a seal or sealant so that liquids do not leak from beneath the toilet 50 onto flooring. Providing sealant about the entire perimeter of a toilet except for a selected seep line 58 portion allows for control of leaking to a designated field 34*a* position and early detection of problems.

Figure 12:
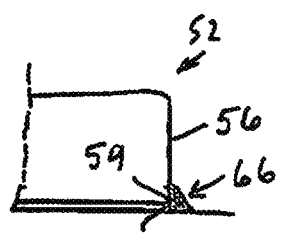
FIG. 12 is a section view taken along line 12-12 of FIG. 8.

FIG. 12 is a partial section view taken along line 12-12 of FIG. 8. In one aspect, side edge 56 of toilet base 52 is positioned such that meeting line 59 aligns with outside perimeter edge 28. In other aspects, perimeter edge 28 will extend slightly outward (or inward) of outer side edge 56. In one aspect, a sealant 66 is positioned or applied to cover or seal the meeting line 59. In one aspect, the sealant 66 contacts both the side edge 56 and the outside perimeter edge 28 and/or a top portion of the tray 22. The sealant 66 may include a coating of silicon or other sealant. Sealant 66 may be applied about the entirety of the meeting line 59 except for the portion forming the seep line 58. Configuring seep line 58 to be devoid of a sealant tends to cause liquids which seep from a broken or failing wax seal to travel upon tray 22 and exit to the seep field 34*a* via travel past seep line 58. Thus, when liquid is pooled at seep field 34*a*, a warning is present that a wax seal is failing or has failed. The failure may be corrected before damage is done to the flooring 40 or other areas.

In a further kit 70 aspect of the invention and again with reference to FIG. 5, a device 20 and retainer 60 are packaged in a box 72 or other package together with instructions 74 (such as a sheet of printed instructions, or instructions provided on the packaging) on how to fit or retrofit a toilet 50 mounted to a floor 40. Instructions in one aspect describe a method aspect of the invention (See FIG. 13). One method 100 aspect of the invention includes the steps of 110 positioning the device 20 above a drain pipe, 120 positioning a toilet base 52 on a tray of the device 20, 130 marking a footprint edge 54, 140 removing the toilet 50 from the device 20, 150 removing the device 20, 160 cutting a line along the marked footprint edge 54 to form a cut device 20', 170 securing the cut device 20' between the floor 40 and toilet base 52, and 180 applying a liquid retainer 60 to the device 20' at a seep field 34*a* which extends outward from a perimeter of the toilet base 52. Further or additional steps include 190 applying a sealant to a meeting line 59 such that at least a portion of a seep line 58 positioned between end portions 62, 64 of the retainer 60 is devoid of a seal so that stray liquids may be retained at the seep field 34*a*. Sealant may be applied to the entirety of the meeting line or substantially the entirety of the meeting line 59. The instructions 74, device 20 and liquid retainer 60 are packaged as a kit 70 in one aspect. In one aspect, the step of cutting along a marked line includes cutting the tray 22 precisely along the marked footprint edge 54 so that the tray is concealed or less visible when positioned between the toilet and the flooring 40 while also accommodating seep field 34*a*.

In one aspect, the device 20 includes an inside perimeter wall 26 which extends below the base 24 of tray 22. For instance, wall 26 may extend about 1 inch below base 24 in which case wall 26 may extend a similar distance into drain pipe 42. The length of inside perimeter wall 26 may vary. In further aspects the perimeter wall 26 may extend downward to a position that is not below the base 24 of tray 22 in order to have a lower profile. In one aspect, device 20 has a total thickness of about 1 inch, where a height of the ring 32 extends upward from base 24 about 0.63 inches. In aspects, the hole 30 has a diameter of 3 inches. In some aspects, inside perimeter wall 26 is configured to slip inside (and/or friction fit within) a standard size drain pipe 42 and in other aspects perimeter wall 26 is positioned outside of or around a standard size drain pipe 42. Device 20 may be used in conjunction with or instead of a closet collar. In further aspects, the ring 32 may include features similar to typical closet collars with slots and other openings to accommodate securing of a toilet to a floor 40 and to or above a drain pipe 42. In further aspects, the material thickness at or about ring 32 may be greater than a thickness of the device 20 at or about areas outside of ring 32. In further aspects, device 20 does not include a ring 32 while still defining a hole 30. In one aspect, mounting ports 36 are spaced from each other about 6.13 inches and oriented generally as shown. The mounting ports 26 may also be oriented at different angles so that device 20 may be positioned with respect to drain pipe 42 or other closet collars at various or desired angles. In one aspect, ring 32 has an outer diameter which measures 8.25 inches (measured from where ring 32 meets base 24 at an upper side of tray 22).

With further reference to FIG. 1, inside perimeter wall 26 extends downward from ring 32. In alternatives no such wall 26 is required; instead, the wax wall 33 (See FIG. 4, for instance) may terminate without a downward extending wall 26. In further alternatives, the downward extending wall 26 shown in FIG. 4 may extend downward only slightly from wax wall 33, such as 1/16 inches or 1/8 inches. In other alternatives, no such wall 26 extends downward from wax wall 33. In further alternatives, device 20 does not include a wax wall 33 and the inside perimeter wall 26 extends downward from ring 32 at a hole edge 31. In such case the wall 26 may extend downward only slightly or may extend a distance equal to or below the planar base 24. In further aspect, the hole 30 is defined by hole edge 31 without having a downwardly extending wall 26. In yet further alternatives, device 20 does not include a ring 32, where hole 30 is defined by hole edge 31 which is positioned at planar base 24. In still further alternatives, device 20 does not include a ring 32, where hole 30 is defined by a perimeter wall 26 extending downward from planar base 24. While the device 20 shown in FIG. 20 shows a perimeter wall 26 extending below planar base 24, in alternatives, device 20 does not include a downward extending wall 26, and may or may not include a wax wall 33.

A further aspect of the invention includes a toilet 50 mounted to a floor 40 utilizing a device 20, 20' or systems 21 or methods 100 referenced herein.

It should be understood, of course, that the foregoing relates to exemplary embodiments of the invention and that modifications may be made without departing from the spirit and scope of the invention as set forth in the following claims.

What is claimed is:

1. A device for protecting flooring beneath a toilet having a toilet base set over a drain pipe in the flooring, the device comprising:
   a one-piece tray having a planar base of a first thickness, an inside perimeter wall having a second thickness substantially equal to the first thickness and defining a hole configured to be positioned over the drain pipe, an outside perimeter edge surrounding the hole and defining a field which extends outward from a footprint of the toilet base when the toilet is positioned upon the tray, and a raised ring circling the hole, the raised ring having a wax wall projecting downward to the inside perimeter wall, the wax wall having a third thickness substantially equal to the first thickness, the perimeter wall extending downward from the raised ring, the thickness of the planar base being substantially uniform extending from the raised ring to the outside perimeter edge.

2. The device of claim 1 where the inside perimeter wall extends downward from the raised ring and below the planar base.

3. The device of claim 1 where the tray is made of semi-rigid PVC.

4. The device of claim 1 where the raised ring is positioned between the field and the inside perimeter wall.

5. The device of claim 1 where the field extends beyond an entirety of the footprint of the toilet base.

6. The device of claim 1 where the tray is a vacuum formed unitary piece of PVC, the field configured to be cut with a hand scissors, the raised ring configured to receive a wax ring along a wax ring wall adjacent the hole, the raised ring defining mounting ports for receiving mounting bolts to secure the toilet base.

7. The device of claim 1 further comprising a liquid retainer positioned upon the field and having a first terminal end to abut a first external area of the toilet base and an opposite second terminal end to abut a second external area of the toilet base.

8. The device of claim 7 where the first terminal end and second terminal end of the liquid retainer define terminal ends of a generally U-shaped liquid retainer.

9. The system of claim 1 where the raised ring has an upper portion having a material thickness greater than the first thickness.

10. The system of claim 1 where the first thickness is about 0.03 inches.

11. The system of claim 1 where the tray has a rigidity such that the tray avoids sagging when held at one end of the tray.

12. The system of claim 1 where the inside perimeter wall extends perpendicularly to the planar base.

13. The system of claim 1 where an interior side of the wax wall slopes upward to an upper portion of the raised ring, the slope being concave.

14. A system for protecting flooring beneath a toilet having a toilet base set over a drain pipe in the flooring, the system comprising:
   a tray defining a hole configured to be positioned over the drain pipe, the tray having an outside perimeter edge surrounding the hole and defining a field which extends outward from the toilet base when the toilet is positioned upon the tray; and
   a liquid retainer configured for placement upon the field and having a first end portion to abut a first external area of the toilet base and a second end portion to abut a second external area of the toilet base, the first end portion being a first terminal end, the second end portion being a second terminal end, the first terminal end and the second terminal end defining a maximum longitudinal length of the retainer.

15. The system of claim 14 where the liquid retainer is a curved, flexible retainer having a flattened bottom portion for placement upon the field.

16. The system of claim 14 where the liquid retainer is a flexible retainer having a slot for receiving an edge of the field.

17. The system of claim 14 defining a footprint where the toilet base meets the tray, an outer edge of the footprint defining a meeting line, a sealant provided to the toilet base and tray to cover at least a portion of the meeting line.

18. The system of claim 14 where the toilet base and the outside perimeter edge of the tray define a meeting line, a sealant covering at least a portion of the meeting line.

19. The system of claim 14 defining a footprint where the toilet base meets the tray, an outer edge of the footprint defining a meeting line, a sealant provided to the toilet base and tray which covers only a portion of the meeting line.

20. A system for protecting flooring beneath a toilet having a toilet base set over a drain pipe in the flooring, the system comprising:
- a tray defining a hole configured to be positioned over the drain pipe, the tray having an outside perimeter edge surrounding the hole and defining a field which extends outward from the toilet base when the toilet is positioned upon the tray; and
- a liquid retainer configured for placement upon the field and having a first end portion to abut a first external area of the toilet base and a second end portion to abut a second external area of the toilet base where the liquid retainer is configured to be secured to the field such that the first end portion and second end portion abut respective first and second external areas of the toilet base located along a lowermost side edge of the toilet base, the lowermost side edge of the toilet base between the first end portion and the second end portion meets the tray at a seep line, at least a portion of the seep line is devoid of a sealant.

* * * * *